US011280127B2

(12) United States Patent
Shi

(10) Patent No.: US 11,280,127 B2
(45) Date of Patent: Mar. 22, 2022

(54) METHOD OF CONTROLLING FOOD CABINET

(71) Applicant: Liwei Shi, Guangdong (CN)

(72) Inventor: Liwei Shi, Guangdong (CN)

( * ) Notice: Subject to any disclaimer, the term of this patent is extended or adjusted under 35 U.S.C. 154(b) by 0 days.

(21) Appl. No.: 16/813,760

(22) Filed: Mar. 10, 2020

(65) Prior Publication Data
US 2021/0214992 A1  Jul. 15, 2021

(30) Foreign Application Priority Data

Nov. 27, 2019  (CN) .......................... 201911184341.8

(51) Int. Cl.
| | |
|---|---|
| *E05F 15/77* | (2015.01) |
| *E05F 15/79* | (2015.01) |
| *E05F 15/70* | (2015.01) |
| *E05F 15/42* | (2015.01) |
| *E05F 15/632* | (2015.01) |
| *A47J 39/00* | (2006.01) |

(52) U.S. Cl.
CPC .............. *E05F 15/77* (2015.01); *A47J 39/00* (2013.01); *E05F 15/42* (2015.01); *E05F 15/632* (2015.01); *E05F 15/70* (2015.01); *E05F 15/79* (2015.01); *E05Y 2900/20* (2013.01)

(58) Field of Classification Search
CPC ......... E05F 15/632; E05F 15/77; E05F 15/42; E05F 15/79; E05Y 2900/20; A47B 31/001; A47B 31/02; A47B 81/00; A47J 39/00; A47J 39/006
See application file for complete search history.

(56) References Cited

U.S. PATENT DOCUMENTS

| | | | | |
|---|---|---|---|---|
| 2,750,611 | A * | 6/1956 | Chatel ..................... | A47L 15/00 15/74 |
| 3,873,114 | A * | 3/1975 | Brown ...................... | B62B 3/02 280/30 |
| 5,197,582 | A * | 3/1993 | Cropley ................... | H02K 7/02 477/21 |
| 9,089,210 | B2 * | 7/2015 | Kool ....................... | A47B 31/04 |
| 10,117,513 | B1 * | 11/2018 | Tolentino ............... | A47B 13/16 |
| 2005/0146255 | A1 * | 7/2005 | Sabo ....................... | A47B 67/00 312/316 |
| 2017/0208940 | A1 * | 7/2017 | Boudreault .............. | A47F 3/02 |

* cited by examiner

Primary Examiner — Justin B Rephann

(57) ABSTRACT

A method of controlling food cabinet is provided, the method includes steps of: receiving, by processor, a first instruction of controlling sliding door to close, and controlling driving device to start closing action of the sliding door based on the first instruction; controlling, by the processor, driving component to drive the fixed block so as to drive the first driving sheet to push the sliding door to close, thereby finishing the first stroke, wherein the first driving sheet butts against the sliding door during the first stroke; controlling, after confirming by the processor that the first stroke is finished, the second driving sheet to adjust to a state in which the second driving sheet butt against the sliding door; and controlling, by the processor, the driving component to drive the fixed block so as to drive the second driving sheet to push the sliding door to close, thereby finishing the second stroke, whereby the sliding door is entirely closed; wherein the second driving sheet butts against the sliding door during the second stroke.

16 Claims, 10 Drawing Sheets

METHOD OF CONTROLLING FOOD CABINET

CROSS-REFERENCE TO RELATED APPLICATIONS

This application claims priority benefits to Chinese Patent Application No. 201911184341.8, filed Nov. 27, 2019, the contents of which are incorporated herein by reference.

TECHNICAL FIELD

The present application relates to a kitchen equipment, especially relates to a method of controlling food cabinet.

BACKGROUND ART

With the continuous improvement of people's living standards, the development of foodservice industry has become more and more prosperous, and hot pot has become one of the most favorite meals. As we all known, every hotpot restaurant would set a self-service condiment table for customers to choose. However, condiment buckets disposed on an existing condiment table in hotpot restaurant are all open, which may be easy to have dust or debris fallen off, therefore it is not healthy enough. While if a lid is disposed on each condiment bucket, it may bring bad impact on taking condiment, and prolong the time for the customer to take condiment, thus causing crowding around the condiment table and affecting the dining experience. In addition, the customer needs to manually close the lid after they took condiment, which may cause trouble for the customer, and may easily overturn a condiment utensil in the customer's hand, or the customer may forget to close the lid, which will affect food preservation.

Chinese patent No. CN204812800 U, of which the tittle is "A HOT POT CONDIMENT TABLE", and Chinese patent No. CN202341662 U, of which the tittle is "MULTIFUNCTION HOT POT CONDIMENT TABLE", disclosed basic structure and working principle of hot pot condiment table. The entire content of the above-identified patents is incorporated herein by reference. When describing embodiments of the present disclosure in the following description, some general structures and working principles can be referred to the two above-identified patents or other published technical literatures, the following description may only introduce invention points and related contents involved in the present disclosure.

SUMMARY

A method of controlling food cabinet is provided, the food cabinet includes a cabinet body, a processor and a driving device; a storage platform is disposed on the cabinet body; at least one storage location and at least one slideable sliding door are disposed on the storage platform; the sliding door corresponds to one or more storage locations, and is configured to cover a material stored in the storage location and to be opened when the material is being taken out; the processor is electrically connected to the driving device and configured to control the driving device to drive the sliding door to close; a closing stroke of the sliding door includes a first stroke and a second stroke, the first stroke defines a fore stroke, and the second stroke defines a hind stroke; the driving device includes at least one driving component, at least one fixed block, a first driving sheet and a second driving sheet, the first driving sheet and the second driving sheet are fixed on the fixed block; the method includes steps of:

receiving, by the processor, a first instruction of controlling the sliding door to close, and controlling the driving device to start closing action of the sliding door based on the first instruction;

controlling, by the processor, the driving component to drive the fixed block so as to drive the first driving sheet to push the sliding door to close, thereby finishing the first stroke, wherein the first driving sheet butts against the sliding door during the first stroke;

controlling, after confirming by the processor that the first stroke is finished, the second driving sheet to adjust to a state in which the second driving sheet is able to butt against the sliding door; and controlling, by the processor, the driving component to drive the fixed block so as to drive the second driving sheet to push the sliding door to close, thereby finishing the second stroke, whereby the sliding door is entirely closed; wherein the second driving sheet butts against the sliding door during the second stroke.

In one embodiment, the food cabinet includes a cabinet body, a processor and a driving device; a storage platform is disposed on the cabinet body; at least one storage location and at least one slideable sliding door are disposed on the storage platform; the sliding door corresponds to one or more storage locations, and is configured to cover a material stored in the storage location and to be opened when the material is being taken out; the processor is electrically connected to the driving device and configured to control the driving device to drive the sliding door to close; a closing stroke of the sliding door includes a first stroke and a second stroke, the first stroke defines a fore stroke, and the second stroke defines a hind stroke; the driving device includes at least one driving component, at least one fixed block, a first driving sheet and a second driving sheet, the first driving sheet and the second driving sheet are fixed on the fixed block; the method includes steps of:

receiving, by the processor, a first instruction of controlling the sliding door to close, and controlling the driving device to start closing action of the sliding door based on the first instruction;

controlling, by the processor, the driving component to drive the fixed block so as to drive the first driving sheet to push the sliding door to close, thereby finishing the first stroke, wherein the first driving sheet butts against the sliding door during the first stroke;

controlling, after confirming by the processor that the first stroke is finished, the second driving sheet to adjust to a state in which the second driving sheet is able to butt against the sliding door, and controlling, by the processor, the driving component to drive the fixed block so as to drive the second driving sheet to push the sliding door to close, thereby finishing the second stroke, whereby the sliding door is entirely closed; wherein the second driving sheet butts against the sliding door during the second stroke.

In one embodiment, the driving device further includes a first sliding bar, the driving component includes a first driving component, the fixed block includes a first fixed block; the first fixed block is disposed on the first sliding bar, the processor is electrically connected to the first driving component;

the step of controlling, by the processor, the driving component to drive the fixed block so as to drive the first driving sheet to push the sliding door to close, thereby finishing the first stroke includes:

controlling, by the processor, the first driving component to drive the first fixed block to slide on the first sliding bar so as to drive the first driving sheet to push the sliding door to close, thereby finishing the first stroke;

the step of controlling, after confirming by the processor that the first stroke is finished, the second driving sheet to adjust to a state in which the second driving sheet is able to butt against the sliding door includes:

controlling, after confirming by the processor that the first stroke is finished, the first driving component to drive the first fixed block to retract a predetermined stroke, and then controlling the second driving sheet to adjust to a state in which the second driving sheet is able to butt against the sliding door and the step of controlling, by the processor, the driving component to drive the fixed block so as to drive the second driving sheet to push the sliding door to close, thereby finishing the second stroke, whereby the sliding door is entirely closed, includes:

controlling, by the processor, the first driving component to drive the first fixed block so as to drive the second driving sheet to push the sliding door to close, thereby finishing the second stroke, whereby the sliding door is entirely closed.

In one embodiment, the driving device further includes a first sensor, the first sensor is electrically connected to the processor;

the step of confirming by the processor that the first stroke is finished includes steps of:

sending a first signal to the processor when the first sensor senses that the sliding door is moved to a final position of the first stroke; and confirming the first stroke is finished when the processor receives the first signal.

In one embodiment, the driving device further includes a second sensor, the second sensor is electrically connected to the processor;

the step of controlling, after confirming by the processor that the first stroke is finished, the first driving component to drive the first fixed block to retract a predetermined stroke, and then controlling the second driving sheet to adjust to a state in which the second driving sheet is able to butt against the sliding door includes:

controlling, after confirming the first stroke is finished, the first driving component to drive the first fixed block to retract to its start position;

sending a second signal to the processor when the second sensor senses that the first fixed block retracts to its start position; and controlling the second driving sheet to adjust to the state in which the second driving sheet is able to butt against the sliding door by the processor when the processor receives the second signal.

In one embodiment, the driving device further includes a third sensor, the third sensor is electrically connected to the processor;

the step of controlling, by the processor the first driving component to drive the first fixed block so as to drive the second driving sheet to push the sliding door to close, thereby finishing the second stroke, whereby the sliding door is entirely closed includes:

sending a third signal to the processor when the third sensor senses that the sliding door is moved to a final position of the second stroke; and controlling the first driving component to stop and driving the first fixed block to retract to its start position when the processor receives the third signal.

In one embodiment, the driving device further includes a fourth sensor, the fourth sensor is electrically connected to the processor, the method further includes steps of:

sending a fourth signal to the processor when the fourth sensor senses an object existing within a predetermined region around the food cabinet; and controlling the first driving component to stop and controlling the first fixed block to retract to its start position when the processor receives the fourth signal.

In one embodiment, the method further includes step of: after controlling the first fixed block to retract to its start position based on the fourth signal, when the fourth sensor senses no object existing within the predetermined region around the food cabinet, controlling the first driving component to re-perform the first stroke and the second stroke after a predetermined time period.

In one embodiment, a first electromagnetic adsorption device is disposed on the first fixed block;

the step of controlling the second driving sheet to adjust to a state in which the second driving sheet is able to butt against the sliding door by the processor includes:

controlling the first electromagnetic adsorption device to be energized, whereby the first electromagnetic adsorption device adsorbs one end of the second driving sheet to make the other end of the second driving sheet cock thereby placing the second driving sheet on the state in which the second driving sheet is able to butt against the sliding door.

In one embodiment, the driving device further includes a second sliding bar and a third sliding bar, the driving component includes a second driving component and a third driving component, the fixed block includes a second fixed block and a third fixed block, the second fixed block is disposed on the second sliding bar, the first driving sheet is disposed on the second fixed block, the third fixed block is disposed on the third sliding bar, the second driving sheet is disposed on the third fixed block; the processor is electrically connected to the second driving component and the third driving component;

the step of controlling, by the processor, the driving component to drive the fixed block so as to drive the first driving sheet to push the sliding door to close, thereby finishing the first stroke includes:

controlling, by the processor, the second driving component to drive the second fixed block to slide on the second sliding bar so as to drive the first driving sheet to push the sliding door to close, thereby finishing the first stroke;

the step of controlling, by the processor, the driving component to drive the fixed block so as to drive the second driving sheet to push the sliding door to close, thereby finishing the second stroke, whereby the sliding door is entirely closed, includes:

controlling, by the processor, the third driving component to drive the third fixed block to slide on the third sliding bar so as to drive the second driving sheet to push the sliding door to close, thereby finishing the second stroke, whereby the sliding door is entirely closed.

In one embodiment, the driving device further includes a fifth sensor; the fifth sensor is electrically connected to the processor;

the step of controlling, after confirming by the processor that the first stroke is finished, the second driving sheet to adjust to a state in which the second driving sheet is able to butt against the sliding door includes:

sending a fifth signal to the processor when the fifth sensor senses that the sliding door is moved to the final position of the first stroke; and controlling the second driving component to stop, driving the second fixed block to retract a predetermined stroke and controlling the second driving sheet to adjust to the state in which the second driving sheet is able to butt against the sliding door after the processor receives the fifth signal.

In one embodiment, the driving device further includes a sixth sensor; the sixth sensor is electrically connected to the processor;

the step of controlling the second driving component to stop, driving the second fixed block to retract a predetermined stroke and controlling the second driving sheet to adjust to the state in which the second driving sheet is able to butt against the sliding door after the processor receives the fifth signal includes:

controlling the first driving component to drive the first fixed block to retract to its start position after the processor receives the fifth signal;

sending a sixth signal to the processor when the sixth sensor senses that the second fixed block retracts to its start position; and controlling the second driving sheet to adjust to the state in which the second driving sheet is able to butt against the sliding door after the processor receives the sixth signal.

In one embodiment, the driving device further includes a seventh sensor, the seventh sensor is electrically connected to the processor; the method further includes steps of:

sending a seventh signal to the processor when the seventh sensor senses that the sliding door is moved to the final position of the second stroke; and controlling the third driving component to stop and driving the third fixed block to retract to its start position when the processor receives the seventh signal.

In one embodiment, the driving device further includes a ninth sensor, the ninth sensor is electrically connected to the processor; the method further includes steps of:

sending a ninth signal to the processor when the ninth sensor senses that the third fixed block retracts to its start position; and controlling the third driving component to stop when the processor receives the ninth signal.

In one embodiment, the driving device further includes an eighth sensor, the eighth sensor is electrically connected to the processor; the method further includes steps of:

sending an eighth signal to the processor when the eighth sensor senses an object existing within the predetermined region around the food cabinet; and controlling the second driving component and the third driving component to stop and driving the second fixed block and the third fixed block to retract to its start position respectively when the processor receives the eighth signal.

In one embodiment, the method further includes step of: after controlling the second fixed block and the third fixed block to retract to its start position respectively based on the eighth signal, when the processor determines that no object exists within the predetermined region around the food cabinet, controlling the second driving component and the third driving component to re-perform the first stroke and the second stroke after a predetermined time period.

In one embodiment, a second electromagnetic adsorption device is disposed on the third fixed block;

the step of controlling the second driving sheet to adjust to the state in which the second driving sheet is able to butt against the sliding door by the processor includes:

controlling the second electromagnetic adsorption device to be energized, whereby the second electromagnetic adsorption device adsorbs one end of the second driving sheet to make the other end of the second driving sheet cock, thereby placing the second driving sheet on the state in which the second driving sheet is able to butt against the sliding door.

BRIEF DESCRIPTION OF THE DRAWINGS

In order to explain the technical solution of embodiments of the present disclosure more clearly, hereinafter the drawings necessary for the description of embodiments will be described briefly. Obviously, these drawings described below are some examples of the present disclosure, based on which, one with ordinary skills in the art, without any creative labor, can also derive other drawings.

DETAILED DESCRIPTION

Figure 1:
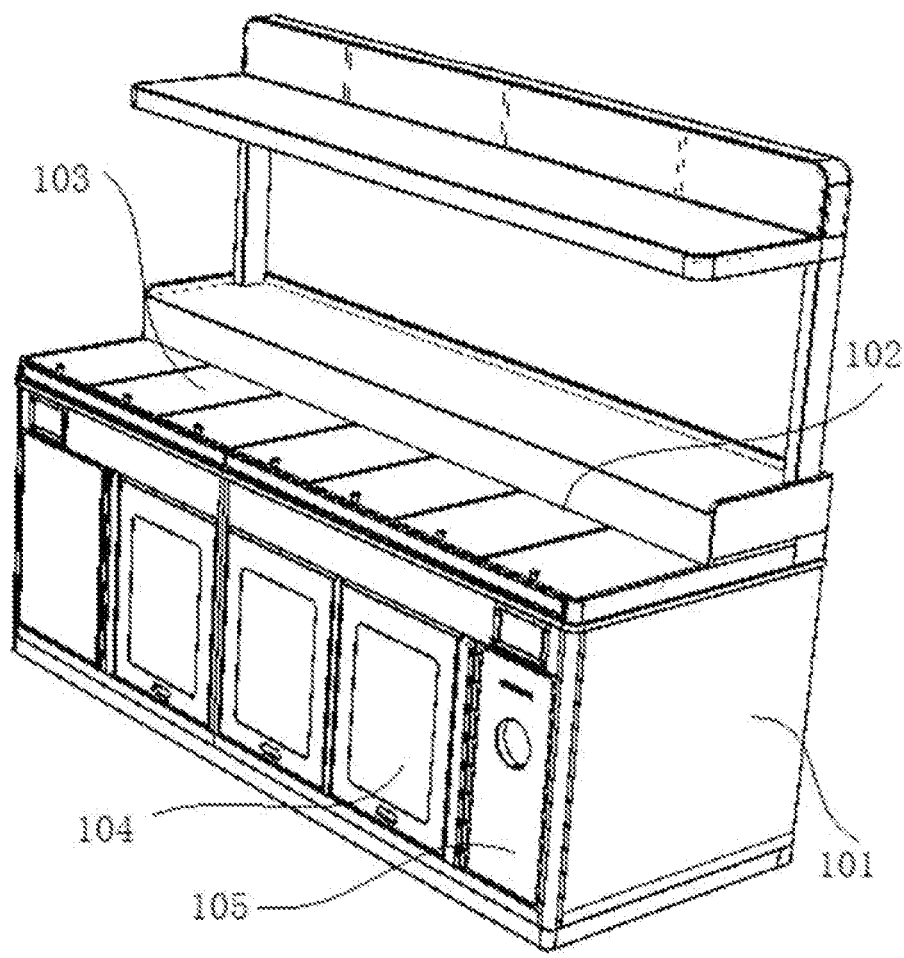
FIG. 1 is a schematic structural view of a food cabinet.
Figure 2:
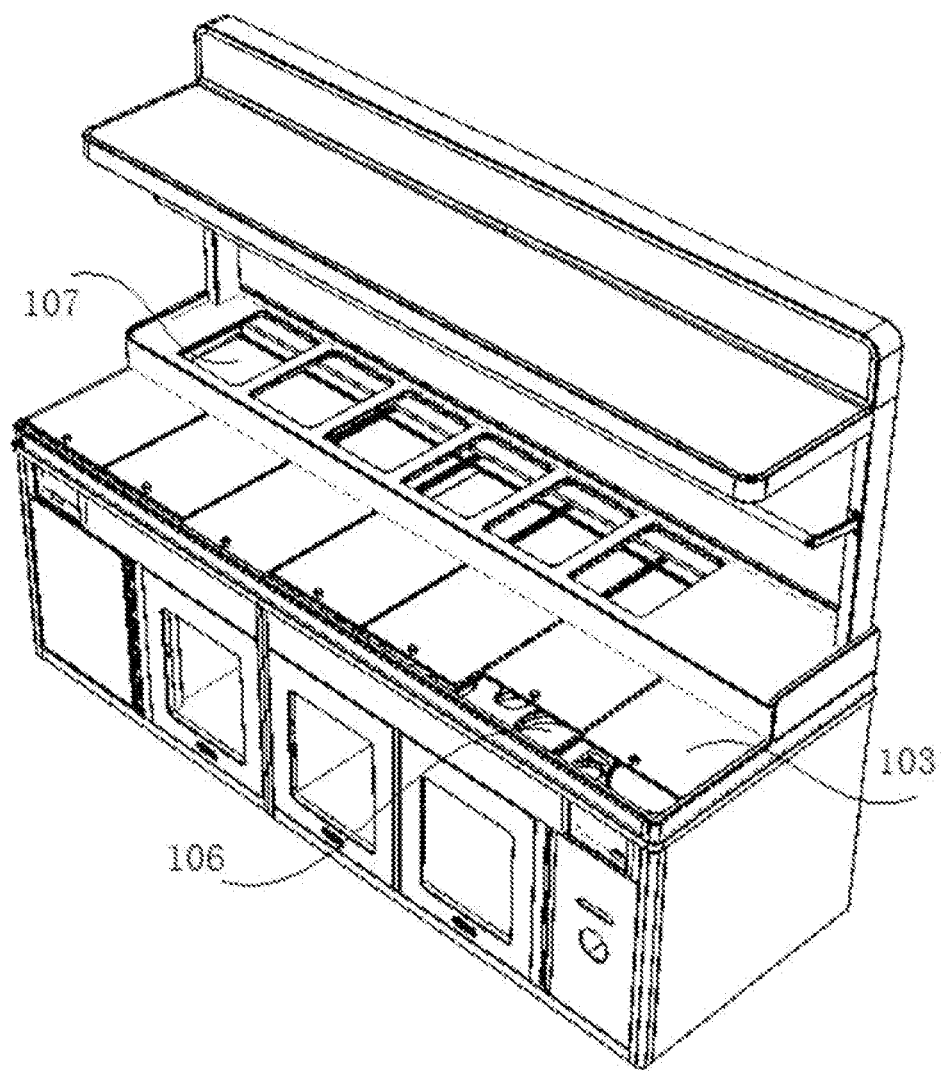
FIG. 2 is a schematic structural view of a food cabinet.
Figure 3:
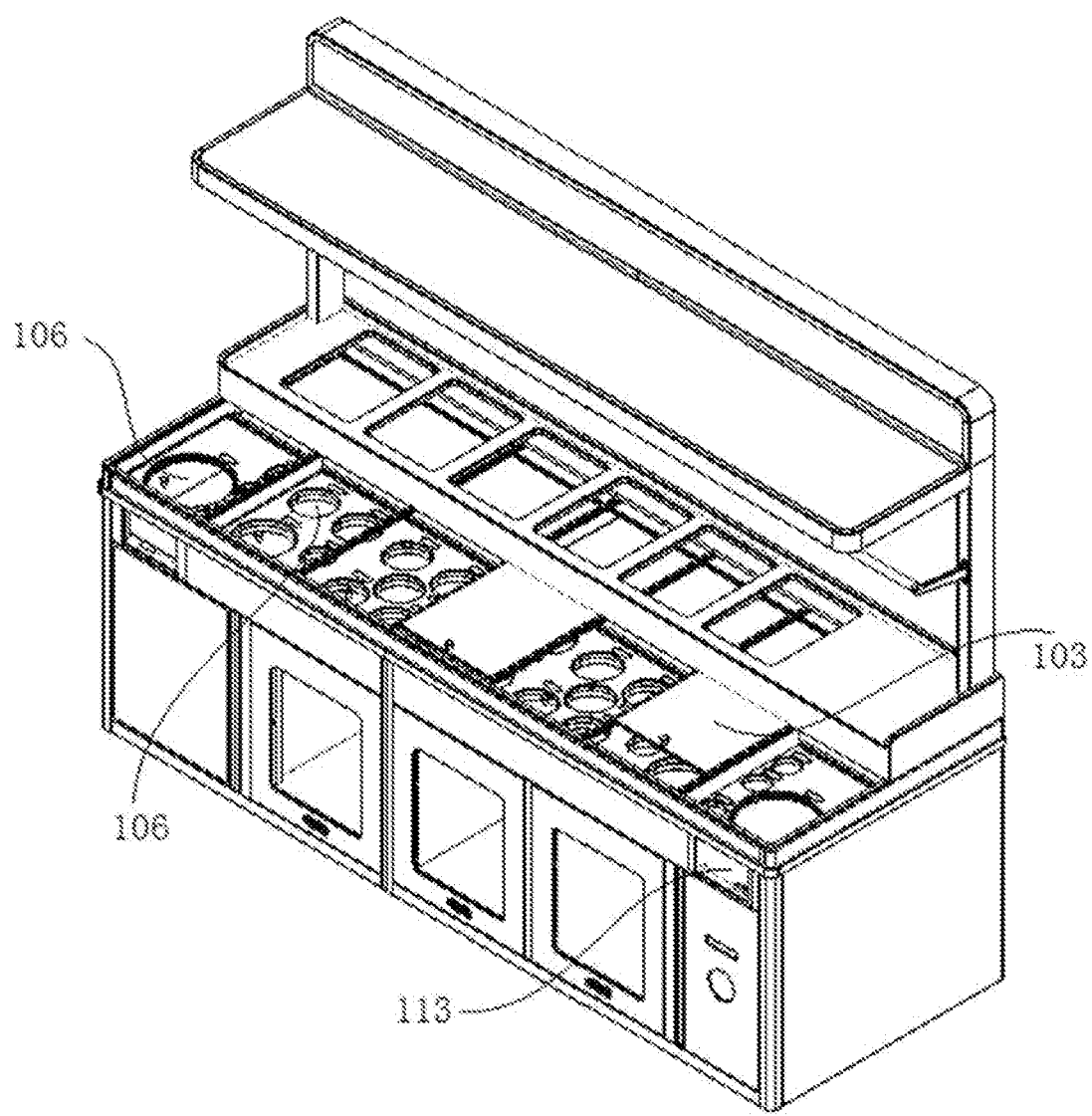
FIG. 3 is a schematic structural view of a food cabinet.

Hereafter the technical solution of embodiments of the present disclosure will be described clearly and completely in accompanying drawings of embodiments of the present disclosure, obviously, these embodiments described are only part, but not all of the embodiments of the present disclosure. All other embodiments that can be made by one with ordinary skills in the art without any creative labor based on these embodiments of the present disclosure shall fall within the protection scope of the present disclosure.

Similar elements described in different embodiments adopt correlative similar reference numbers. In embodiments described below, many details are described only for better understanding the present disclosure. However, one with ordinary skills in the art would effortlessly recognize that some technical features of the present disclosure could be omitted under different circumstances, or replaced by other elements, materials or methods. Under some circumstances, some relevant operations of the present disclosure are not shown or described in the specification in order to prevent key part of the present disclosure from being submerged by too many descriptions, in addition, for those with ordinary skill in the art, it is not necessary to describe these relevant operations in detail, they could fully understand these relevant operations according to the description in the specification and general technical knowledge in the art.

In addition, characteristics, operations or technical features described in the specification could be arranged together in any appropriate manner so as to form various embodiments. At the mean time, sequence of each step or action described in the method could also be exchanged or adjusted in a way that obvious to those skilled in the art. Therefore, various sequences in the specification and drawings are described for clearly describing a particular embodiment only, which does not imply that it is the necessary sequence, unless otherwise clearly specified.

The wording itself, such as "first" and "second", labeled for elements of the present disclosure are only used for the purpose of distinguishing, and do not contain any sequential or technical meaning. While, unless otherwise clearly specified and defined, terms such as "connected", "joint", should represent directly connection, and indirectly connection (joint). In addition, term "comprise" and their variants have non-exclusive meaning. For example, a process, a method, a system, a product or a device comprising a series of steps or units should not be constructed to be limited to these steps or units that already listed, and should be constructed to optionally include other steps or units that are not listed, or should be constructed to optionally further include other steps or units that are inherent in these process, method, system, product or device.

Please refer to FIGS. 1-6, which show a schematic structural view of a food cabinet according to an embodiment of the present disclosure. A storage platform 102 is disposed on a cabinet body 101; at least one storage location 106 is disposed on the storage platform 102. Shape and size of the storage location could be designed depend on actual needs. At least one slideable sliding door 103 are disposed on the storage platform 102; the sliding door 103 corresponds to one or more storage locations, and is configured to cover a material stored in the storage location and to be opened when the material is being taken out.

In some embodiments, a storage location 107 that do not need a sliding door could also be disposed on the storage platform to store materials, of course, storage location 107 could also be an article location, which could be used to place articles, such as seasoning dishes, spoons, etc.

In some embodiments, at lease one storage cabinet 105 is disposed within the cabinet body 101, which is used for storing bowls, spoons, etc. The size and shape of the storage cabinet 105 could be designed depend on the articles that actual need to be stored.

In some embodiments, a cabinet door 104 is disposed on the storage cabinet 105. The cabinet door 104 may be designed to be open and close manually.

Figure 4:
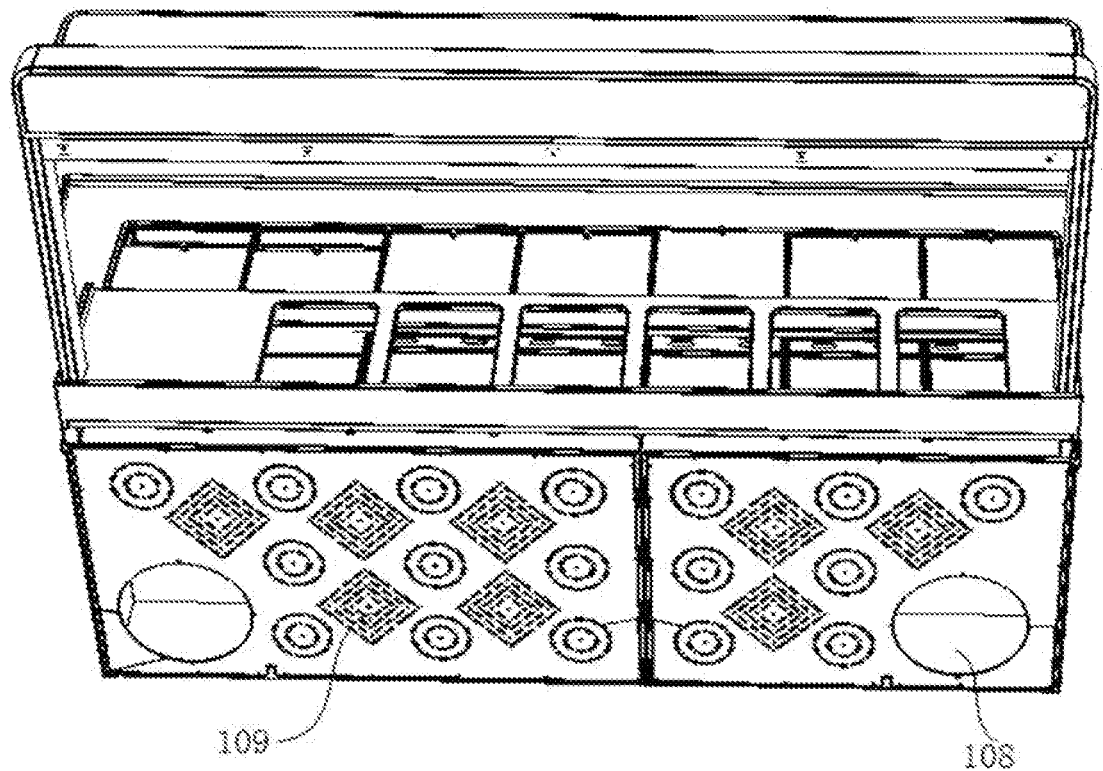
FIG. 4 is a schematic structural view of a food cabinet.
Figure 5:
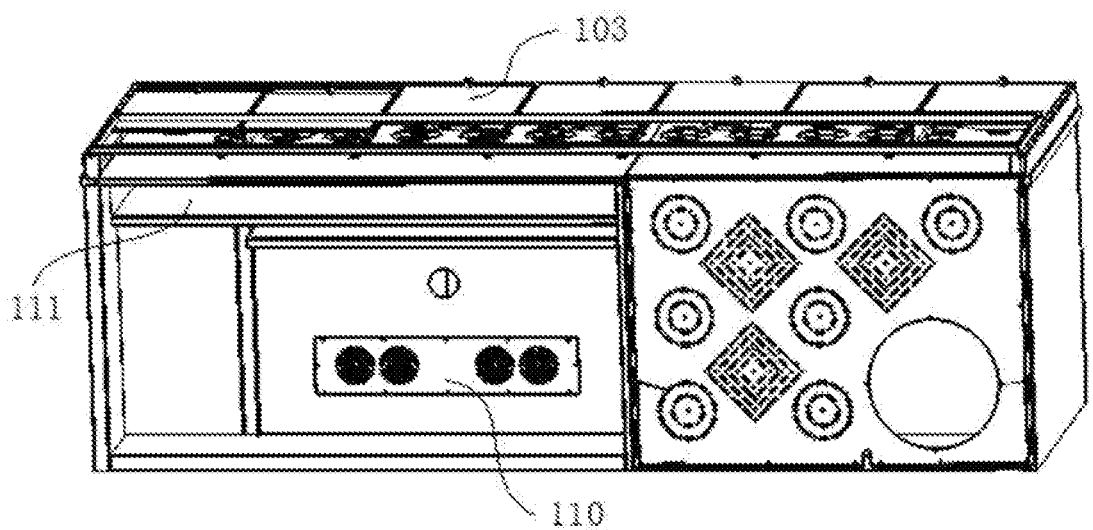
FIG. 5 is an internal schematic structural view of a food cabinet.

As shown in FIG. 5, in some embodiments, in order to preserve heat for the materials (for example, hot pot condiments) stored in the storage platform 102 or refrigerate them, a heater and/or a cooler 110 is disposed within the cabinet body 101. Certainly, other elements (not shown in FIGS), such as a cooling fan, a power supply device, and a controlling circuit board, may be disposed within the cabinet body 101, so as to ensure normal operation of the food cabinet. As shown in FIG. 4, numbered as 108, 109, elements, such as a heat emission hole, and a power cord outlet, are disposed on back of the cabinet body 101.

In some embodiments, a touching screen is disposed on the cabinet body, which is configured to be used for controlling power supply, temperature of heater and cooler.

The food cabinet further includes a processor (not shown in FIGS, which may be disposed on a controlling circuit board in the cabinet body 101) and a driving device. The processor is electrically connected to the driving device and configured to control the driving device to drive the sliding door to close; a closing stroke of the sliding door includes a first stroke and a second stroke, the first stroke defines a fore stroke, and the second stroke defines a hind stroke; the driving device includes at least one driving component, at least one fixed block, a first driving sheet and a second driving sheet, the first driving sheet and the second driving sheet are fixed on the fixed block; during the first stroke, the first driving sheet butts against the sliding door 103, the driving component drives the sliding door 103 to close, thereby finishing the first stroke; during the second stroke, the second driving sheet butts against the sliding door 13, the driving component drives the sliding door 103 to close, thereby finishing the second stroke.

In some embodiments, the driving component includes a driving motor or air cylinder. In some other embodiments, the driving component includes other regular devices in the art that could drive the fixed block to slide.

As shown in FIG. 5, the driving device is disposed within a space numbered 111. In some embodiments, a number of the driving device is equal to a number of the sliding door 103 that needs to be driven, that is one driving device drives one sliding door 103 to close.

Figure 6:
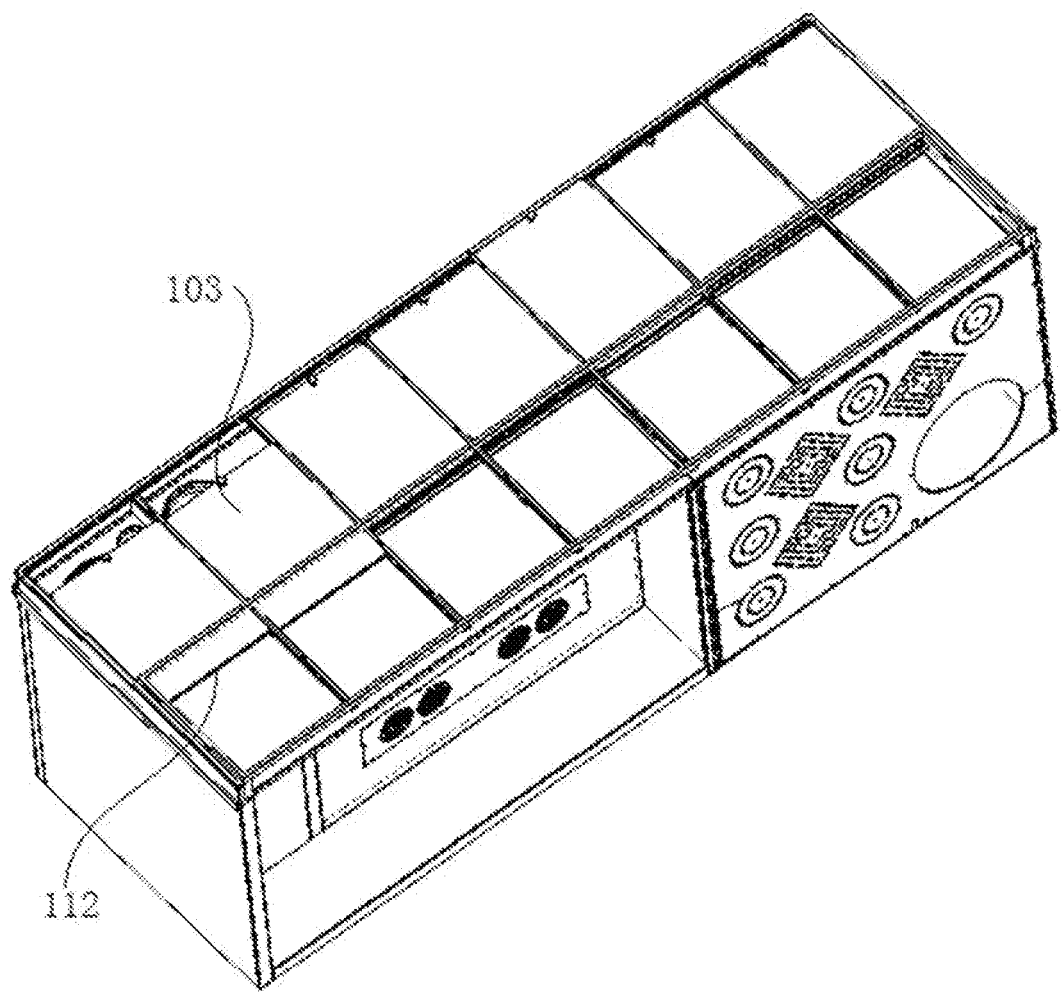
FIG. 6 is a major schematic structural view of a food cabinet.

As shown in FIG. 6, the first driving sheet and the second driving sheet of the driving device butts against an edge position shown as 112 of the sliding door 103, so as to push the sliding door 103 to close. In specific embodiments, in order to make sure that the first driving sheet and the second driving sheet butts against the edge 112 of the sliding door 103 better, a portion of the first driving sheet and the second driving sheet that butt against the edge 112 includes an upturned structure, as shown in FIGS. 7-10.

Structure of the driving device and working principle of driving the sliding door 103 to close will be described in detail in the following description.

Figure 7:
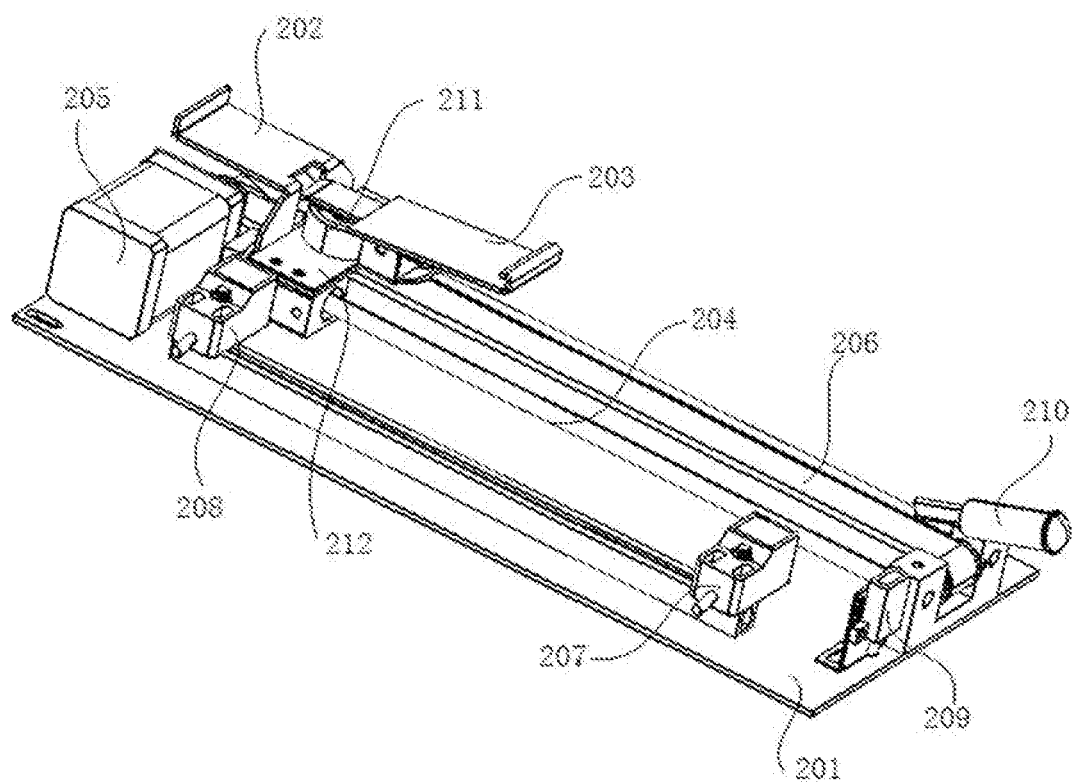
FIG. 7 is a schematic structural view of a single-motor driving device of a food cabinet that configured to drive a sliding door to close.
Figure 8:
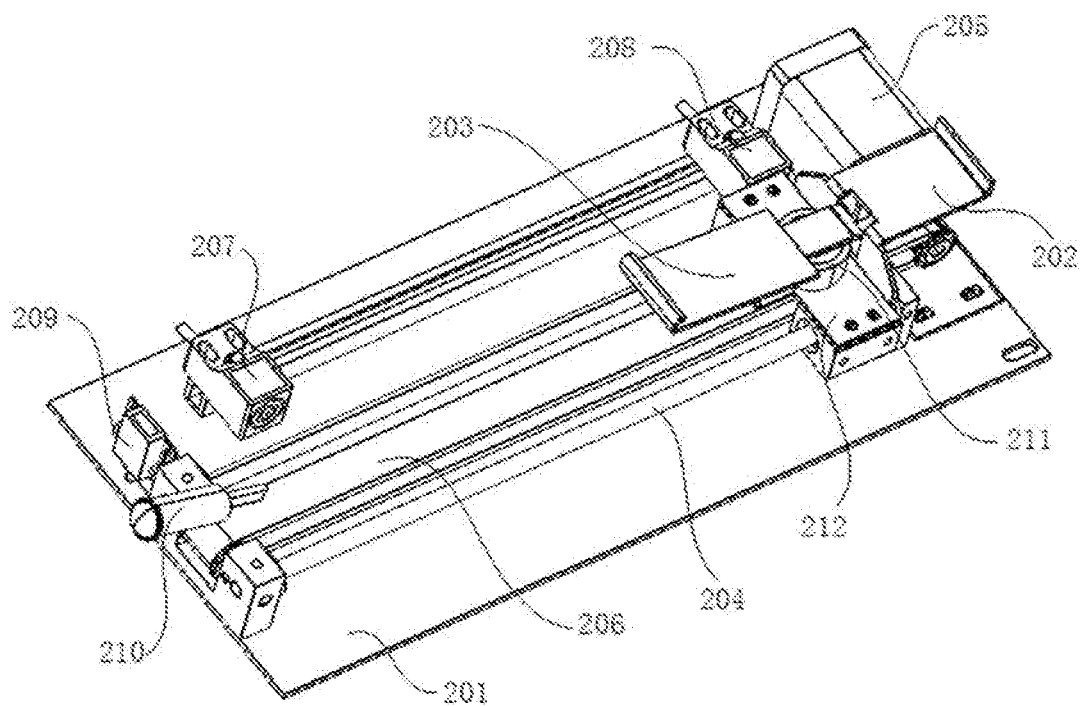
FIG. 8 is a schematic structural view of a single-motor driving device of a food cabinet that configured to drive a sliding door to close.

As shown in FIG. 7-8, in some embodiments, the driving device includes a single-motor driving device 201, which includes a first sliding bar 204, the driving component includes a first driving component 205, the fixed block includes a first fixed block 212; the first fixed block 212 is disposed on the first sliding bar 204, the processor is electrically connected to the first driving component 205 so as to control the first driving component 205 to drive the first fixed block 212 to move along the first sliding bar 204 during the first stroke; the processor is also configured to control the first driving component 205 to drive the first fixed block 212 to retract a predetermined stroke after confirming that the first stroke is finished, and then control the first fixed block 212 to adjust the second driving sheet 203 to a state in which the second driving sheet 203 is able to butt against the sliding door, so as to further control the first driving component 205 to drive the first fixed block 212 to finish the second stroke.

When the sliding door 103 is open and needs to be closed, during the first stroke in these embodiments, the first driving component 205 firstly drives the first fixed block 212 so as to drive the first driving sheet 202 to push the sliding door 103 to move; during the second stroke, the first driving component 205 drives the first fixed block 212 so as to drive the first driving sheet 202 and the second driving sheet 203 to retract a predetermined stroke. After that, the first fixed block 212 adjusts the second driving sheet 203 to the state in which the second driving sheet 203 is able to butt against the sliding door 103, at this moment, the first driving component 205 drives the first fixed block 212 so as to drive the second driving sheet 203 to keep push the sliding door 103 to move, thereby realizing entirely close of the sliding door 103.

It should be noted that, during the first stroke, in order to prevent the second driving sheet 203 from hindering normal close of the sliding door 103, the second driving sheet 203 should be placed on a predetermined position state (for example, a state in which the second driving sheet 203 does not butt against the sliding door 103). When the first stroke is finished and the first fixed block 212 retracts the predetermined stroke, then the first fixed block 212 is adjusted to the state in which the second driving sheet 203 is able to butt against the sliding door 103. In some embodiments, the predetermined stroke is the first fixed block 212 retracts to its original position, as long as the first fixed block 212 won't prevent the second driving sheet 203 from being normally adjusted to a state in which the second driving sheet 203 is able to butt against the sliding door 103, after the first fixed block 212 retracts.

In a specific embodiment, the sliding bar 204 includes one single sliding bar or multiple sliding bars.

In some embodiments, the driving device further includes a first sensor 207, the first sensor 207 is electrically connected to the processor, the first sensor 207 is configured to send a first signal to the processor when the first sensor 207 senses that the sliding door 103 is moved to a final position of the first stroke; the processor is configured to control the first driving component 205 to stop, drive the first fixed block to retract, and control the first fixed block 212 to adjust the second driving sheet 203 to a state in which the second driving sheet 203 is able to butt against the sliding door 103 based on the first signal, so as to further control the first driving component 205 to drive the first fixed block 212 to finish the second stroke.

In some embodiments, the driving device further includes a second sensor 208, the second sensor 208 is electrically connected to the processor, the second sensor 208 is configured to send a second signal to the processor when the second sensor 208 senses that the first fixed block 212 retracts to its start position; the processor is configured to control the first fixed block 212 to adjust the second driving sheet 203 to the state in which the second driving sheet 203 is able to butt against the sliding door 103 based on the second signal, so as to further control the first driving component 205 to drive the first fixed block 212 to finish the second stroke.

In some embodiments, the driving device further includes a third sensor 209, the third sensor 209 is electrically connected to the processor, the third sensor 209 is configured to send a third signal to the processor when the third sensor 209 senses that the sliding door 103 is moved to a final position of the second stroke; the processor is configured to control the first driving component 205 to stop and drive the first fixed block 212 to retract to its start position based on the third signal. At this moment, the second driving sheet 203 is restored to its original state, and doesn't maintain in a state in which the second driving sheet 203 is able to butt against the sliding door 103.

The driving device further includes a fourth sensor 210, the fourth sensor 210 is electrically connected to the processor, the fourth sensor 210 is configured to send a fourth signal to the processor when the fourth sensor 210 senses an object existing within a predetermined region around the food cabinet; the processor is configured to control the first driving component 205 to stop and control the first fixed block 212 to retract to its start position based on the fourth signal. For example, when the fourth sensor 210 senses that a person exists within the predetermined region around the food cabinet, it may be predicted that this person may need to take material from the food cabinet, at this moment, the fixed block needs to be retracted to its start position, so as to make sure that the costumer could open the sliding door 103 manually in order to take material.

In some embodiments, the processor is configured to control the first fixed block 212 to retract to its start position based on the fourth signal, and control the first driving component 205 to re-perform the first stroke and the second stroke after a predetermined time period when the fourth sensor senses no object existing within the predetermined region around the food cabinet.

Namely, the fourth sensor 210 doesn't sense that the person within the predetermined region around the food cabinet, it may be predicted that this person may have got his material and left, at this moment, the sliding door 103 needs to be closed. In order to make sure that this person has indeed got his material and left, the closing action of the sliding door 103 should be carried out after a reasonable predetermined time period. In addition, after the customer has taken his material, since the device may do not know whether the sliding door 103 is open or closed, and the accurate position of the sliding door 103, therefore, the first stroke and the second stroke will be re-performed, so as to achieve fault tolerance. That is, it could be understood that, in these embodiments, as long as a closing process of the sliding door 103 is interrupted, the first stroke and the second stroke will be re-performed to close the sliding door 103. Certainly, in some other embodiments, some other common detection means may be adopted, for example, a sliding door position detection sensor is disposed, an accurate position of the sliding door after the customer has taken his material is been detected, thus to further determine that whether the first stroke and the second stroke should be re-performed, or only the second stroke should be performed.

In some embodiments, a first electromagnetic adsorption device 211 is disposed on the first fixed block 212; the first electromagnetic adsorption device 211 is configured to, after the first electromagnetic adsorption device 211 is energized, adsorb one end of the second driving sheet 203 to make the other end of the second driving sheet 203 cock, thereby placing the second driving sheet 203 on the state in which the second driving sheet 203 is able to butt against the sliding door 103. Specifically, the first electromagnetic adsorption device 211 can be an electromagnet, which is magnetic when it is energized. The second driving sheet 203 adopts materials that can be adsorbed by magnetic material, such as ferrous material, or a permanent magnet having a magnetic pole that opposite to that of the electromagnet after being energized.

Certainly, one with ordinary skills in the art would know that, in order to realize the state in which the second driving sheet 203 is able to butt against the sliding door 103, some common structure in the art may be adopted.

In some embodiments, the first driving component 205 drives the first fixed block 212 to slide on the first sliding bar 204 through a transmission belt 206.

Figure 9:
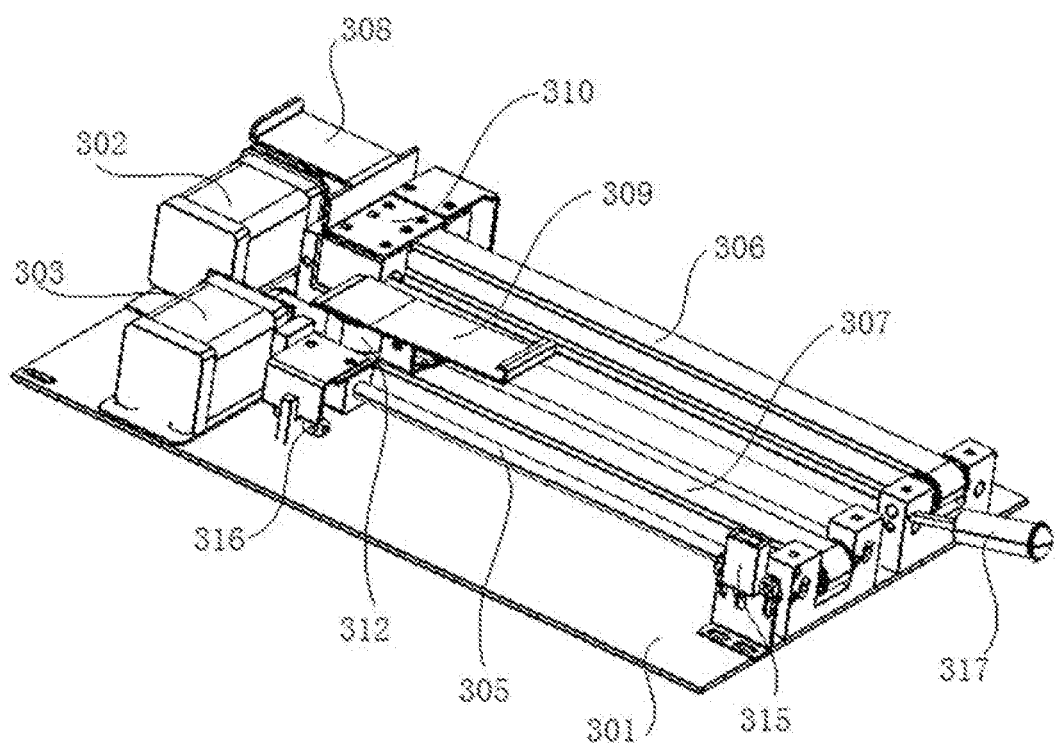
FIG. 9 is a schematic structural view of a dual-motor driving device of a food cabinet that configured to drive a sliding door to close.
Figure 10:
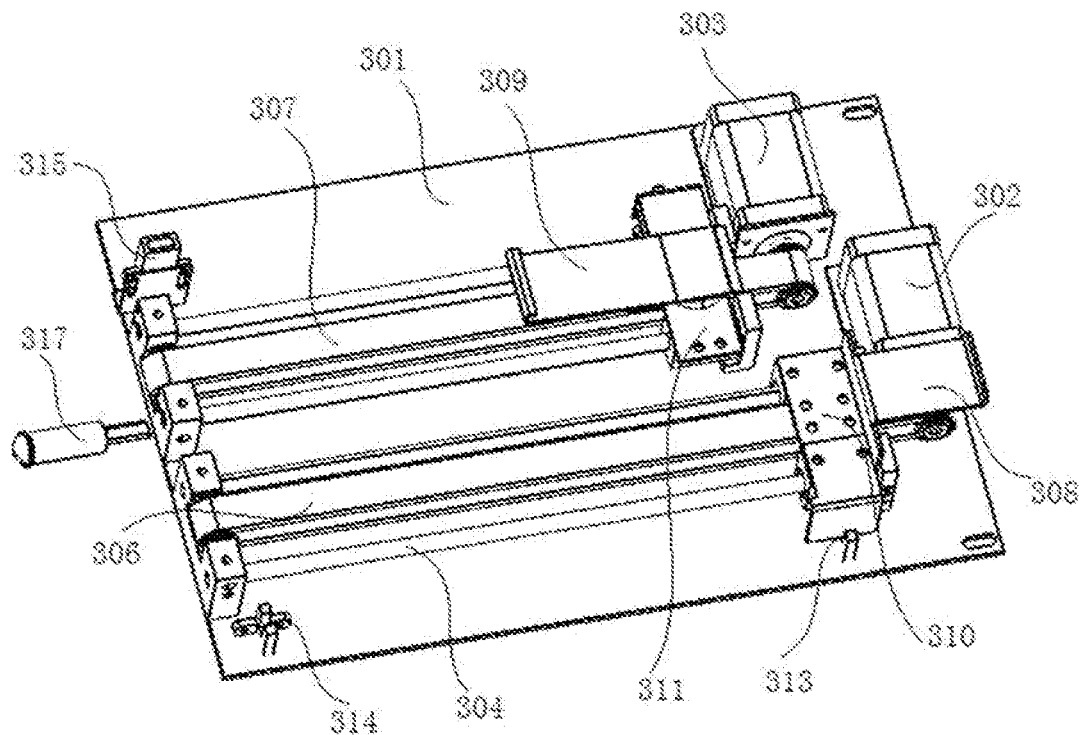
FIG. 10 is a schematic structural view of a dual-motor driving device of a food cabinet that configured to drive a sliding door to close.

As shown in FIG. 9 and FIG. 10, in some embodiments, the driving device includes a dual-motor driving device 301, which includes a second sliding bar 304 and a third sliding bar 305, the driving component includes a second driving component 302 and a third driving component 303, the fixed block includes a second fixed block 310 and a third fixed block 311, the second fixed block 310 is disposed on the second sliding bar 304, the first driving sheet 308 is disposed on the second fixed block 310; the third fixed block 311 is disposed on the third sliding bar 305, the second driving sheet 309 is disposed on the third fixed block 311; the processor is electrically connected to the second driving component 302 and the third driving component 303 so as to control the second driving component 302, during the first stroke, to drive the second fixed block 310 to slide along the second sliding bar 304 and control the third driving component 303, during the second stroke, to drive the third fixed block 311 to slide along the third sliding bar 305.

When the sliding door 103 needs to be closed after being opened, during the first stroke in these embodiments, the second driving component 302 firstly drives the second fixed block 310 so as to drive the first driving sheet 308 to push the sliding door 103 to move. When a final position of the first stroke is reached, the second driving component 302 drives the second fixed block 310 to retract a predetermined stroke, and then the third fixed block 311 adjusts the second driving sheet 309 to the state in which the second driving sheet 309 is able to butt against the sliding door 103. At this moment, the second stroke begins, the third driving component 303 drives the third fixed block 311 so as to drive the second driving sheet 309 to keep on pushing the sliding door 103 to move, thereby realizing entirely close of the sliding door 103.

It should be noted that, during the first stroke, in order to prevent the second driving sheet 309 from hindering normal close of the sliding door 103, the second driving sheet 309 should be placed on a predetermined position state (for example, a state in which the second driving sheet 309 does not butt against the sliding door 103). When the first stroke is finished, the second driving sheet 309 is then adjusted to a state in which the second driving sheet 309 is able to butt against the sliding door 103, in addition, the second driving component 302 drives the second fixed block 310 to retract a predetermined stroke. In some embodiments, the predetermined stroke is that the first fixed block 212 retracts to its original position, so as to be prepared for the next closing action.

In some specific embodiments, both the second sliding bar 304 and the third sliding bar 305 include one single sliding bar or multiple sliding bars.

In some embodiments, the driving device further includes a fifth sensor 314; the fifth sensor 314 is electrically connected to the processor, the fifth sensor 314 is configured to send a fifth signal to the processor when the fifth sensor 314 senses that the sliding door 103 is moved to the final position of the first stroke; the processor is configured to, based on the fifth signal, control the second driving component 302 to stop, drive the second fixed block 310 to retract, and control the third fixed block 311 to adjust the second driving sheet 309 to adjust to the state in which the second driving sheet 309 is able to butt against the sliding door, so as to further control the third driving component 303 to drive the third fixed block 311 to finish the second stroke.

In some embodiments, the driving device further includes a sixth sensor 313; the sixth sensor 313 is electrically connected to the processor, the sixth sensor 313 is configured to send a sixth signal to the processor when the sixth sensor 313 senses that the second fixed block 310 retracts to its start position; the processor is configured to, based on the sixth signal, control the third fixed block 311 to adjust the second driving sheet 309 to the state in which the second driving sheet 309 is able to butt against the sliding door 103, so as to further control the third driving component 303 to drive the third fixed block 311 to finish the second stroke.

In some embodiments the driving device further includes a seventh sensor 315, the seventh sensor 315 is electrically connected to the processor, the seventh sensor 315 is configured to send a seventh signal to the processor when the seventh sensor 315 senses that the sliding door 103 is moved to the final position of the second stroke; the processor is configured to, based on the seventh signal, control the third driving component 303 to stop and drive the third fixed block 311 to retract to its start position. At this moment, the third driving sheet 309 is restored to its original state, and doesn't maintain in a state in which the third driving sheet 309 is able to butt against the sliding door 103.

In some embodiments, the driving device further includes a ninth sensor 316, the ninth sensor 316 is electrically connected to the processor the ninth sensor 316 is configured to send a ninth signal to the processor when the ninth sensor 316 senses that the third fixed block 311 retracts to its start position; the processor is configured to, based on the ninth signal, control the third driving component 303 to stop.

In some embodiments, the driving device further includes an eighth sensor 317, the eighth sensor 317 is electrically connected to the processor, the eighth sensor 317 is configured to send an eighth signal to the processor when the eighth sensor 317 senses an object existing within the predetermined region around the food cabinet; the processor is configured to, based on the eighth signal, control the second driving component 303 and the third driving component 303 to stop and drive the second fixed block 310 and the third fixed block 311 to retract to its start position respectively. For example, when the eighth sensor 317 senses a person within the predetermined region around the food cabinet, it may be predicted that this person may need to take material from the food cabinet, at this moment, the fixed block needs to be retracted to its start position, so as to make sure that the costumer could open the sliding door 103 manually in order to take material.

In some embodiments, the processor is configured to, after controlling the second fixed block 310 and the third fixed block 311 to retract to its start position respectively based on the eighth signal, and the eighth sensor 317 senses that no object exists within the predetermined region around the food cabinet, control the second driving component 302 and the third driving component 303 to re-perform the first stroke and the second stroke after a predetermined time period.

That is, when the eighth sensor 317 senses that no object exists within the predetermined region around the food cabinet, it may be predicted that this person may have got his material and left, at this moment, the sliding door 103 needs to be closed. In order to make sure that the customer has indeed got his material and left, the closing action of the sliding door 103 should be carried out after a reasonable predetermined time period. In addition, after the customer has taken his material, since the device may do not know whether the sliding door 103 is open or closed, and the accurate position of the sliding door 103, therefore, the first stroke and the second stroke will be re-performed, so as to achieve fault tolerance. That is, it could be understood that, in these embodiments, as long as a closing process of the sliding door 103 is interrupted, the first stroke and the second stroke will be re-performed to close the sliding door 103. Certainly, in some other embodiments, some other common detection means may be adopted, for example, a sliding door position detection sensor is disposed, an accurate position of the sliding door after the customer has taken his material is been detected, thus to further determine that whether the first stroke and the second stroke should be re-performed, or only the second stroke should be performed.

In some embodiments, a second electromagnetic adsorption device 312 is disposed on the third fixed block 313; the second electromagnetic adsorption device 312 is configured to, after the second electromagnetic adsorption device 312 is energized, adsorb one end of the second driving sheet 309 to make the other end of the second driving sheet 309 cock, thereby placing the second driving sheet 309 on the state in which the second driving sheet 309 is able to butt against the sliding door 103. Specifically, the second electromagnetic adsorption device 312 can be an electromagnet, which is magnetic when it is energized. The second driving sheet 309 adopts materials that can be adsorbed by magnetic material, such as ferrous material, or a permanent magnet having a magnetic pole that opposite to that of the electromagnet after being energized.

Certainly, one with ordinary skills in the art would know that, in order to realize the state in which the second driving sheet 203 is able to butt against the sliding door 103, some common structure in the art may be adopted.

In some embodiments, the second driving component 302 drives the second fixed block 310 to slide on the second sliding bar 304 through a transmission belt 306, the third driving component 303 drives the third fixed block 311 to slide on the third sliding bar 305 through a transmission belt 307.

It should be noted that, specifically, the food cabinet, recited in these above-mentioned embodiments, includes a hot-pot seasoning table.

In the above-mentioned embodiments, the sensor that senses a position of the fixed block may be omitted in some embodiments, a move-forward or retract distance of the fixed block may be controlled through program settings, therefore to achieve a same purpose.

The various sensors in these above-mentioned embodiments include an infrared sensor, or other kinds of sensors that having corresponding functions.

Figure 11:
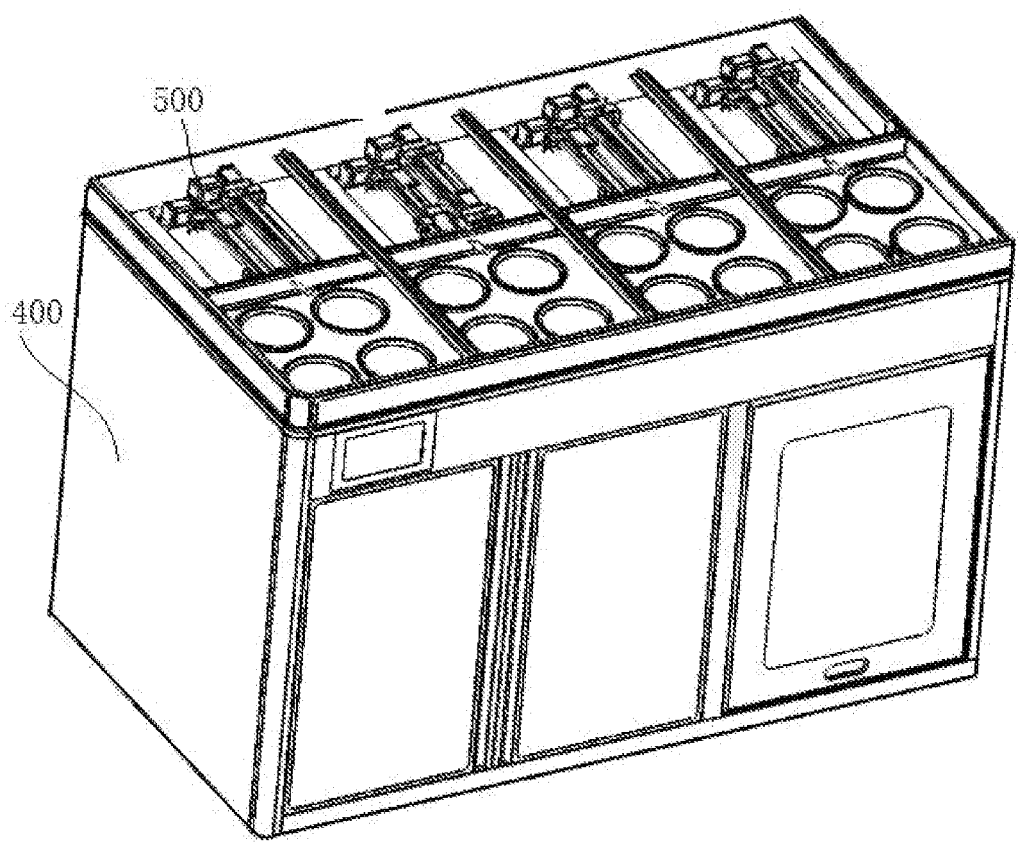
FIG. 11 is a schematic structural view of a food cabinet on which a dual-motor driving device configured to drive a sliding door to close is disposed.

The structure, such as driving device, sensors, sliding bars, mentioned in these above-mentioned embodiments, may be disposed on a location on the cabinet body of the food cabinet, in order to realize their corresponding function respectively, which may not be limited to those location that shown in the drawings only. As shown in FIG. 11, multiple dual-motor driving devices 500 are disposed within the cabinet body 400 of the food cabinet, so as to control multiple sliding doors to close.

In these above-mentioned embodiments, the sliding door 103 has a function of automatic closing, and the opening of the sliding door may be done through manually pushing. In some other embodiments, it may be designed that the sliding door is opened automatically, and an automatically closing plan according to the present disclosure is adopted.

Generally, the food cabinet is placed within kitchen or dining room against the wall. In actual using scenarios, it is often hoped that the food cabinet could occupy area as small as possible. However, for those cabinets that involves a sliding door, since structure of the driving device itself would occupy a certain width (redundant width), in order to make sure that the sliding door could be entirely closed, for a single stroke driving device, either the width of the sliding door is smaller, or the width of the whole cabinet body (which means the distance between the bottom and back of the food cabinet) is larger, so as to offset the redundant width of a single stroke driving device. Therefore, this may make it harder to make full use of the whole cabinet along its width direction, and increase an occupying area.

While in food cabinet provided in embodiments of the present disclosure, since two strokes (the first stroke and the second stroke) are set in order to push the sliding door to close, the redundant width of the driving device itself will no longer be offset through reducing the width of the sliding door or increasing the width of the cabinet body. Therefore, the redundant width of the driving device will no longer be considered when designing the width of the sliding door and the width of the cabinet body, which may realize a smaller volume of the cabinet body, and a smaller occupying area. In the meantime, automatically closing of the sliding door of the food cabinet may be realized.

Figure 12:
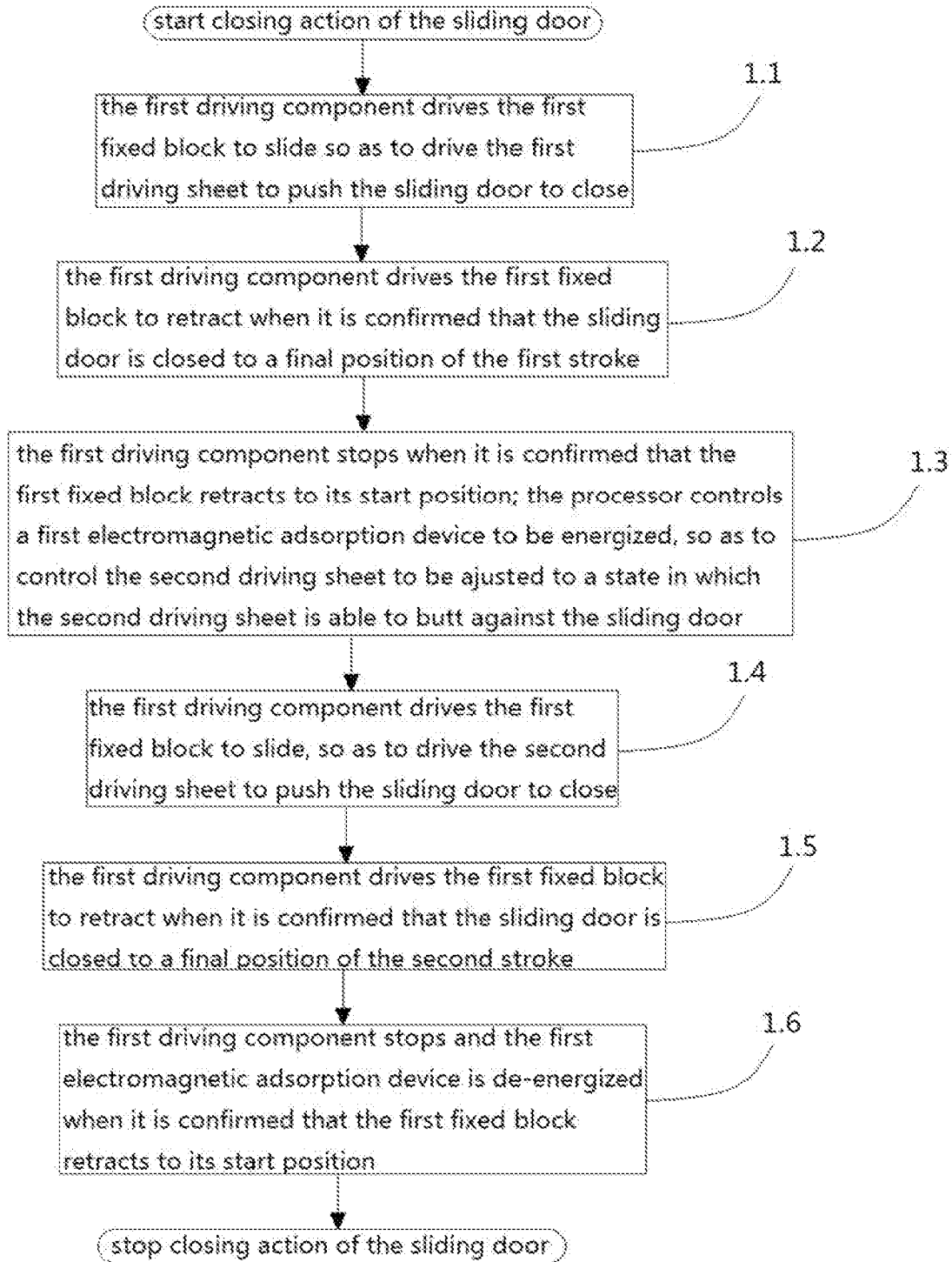
FIG. 12 is a flow chart of a method of controlling food cabinet according to one embodiment.

Please refer to FIG. 12, which shows a flow chart of a method of controlling a single-motor food cabinet according to one embodiment, the method may be adopted in those food cabinet provided in these above-mentioned embodiments that driven by a single-motor, the method includes steps of:

Step 1.1: the processor receives a first instruction of controlling the sliding door to close, and control the first driving component to start closing action of the sliding door base on the first instruction, the first driving component drives the first fixed block to slide so as to drive the first driving sheet to push the sliding door to close. The first instruction may be activated by the user's motion input, or automatically generated by the food cabinet when a preset rule is met.

Step 1.2: when it is confirmed that the sliding door is closed to a final position of the first stroke, the first driving component drives the first fixed block to retract.

Step 1.3: when it is confirmed that the first fixed block retracts to its start position, the first driving component stop; the processor controls the first electromagnetic adsorption device to be energized, so as to control the second driving sheet to be adjusted to a state in which the second driving sheet is able to butt against the sliding door.

Step 1.4: the first driving component drives the first fixed block to slide, so as to drive the second driving sheet to push the sliding door to close.

Step 1.5: when it is confirmed that the sliding door is closed to a final position of the second stroke, the first driving component drives the first fixed block to retract.

Step 1.6: when it is confirmed that the first fixed block retracts to its start position, the first driving component stops, and the first electromagnetic adsorption device is de-energized, the sliding door is entirely closed.

In one embodiment, the method of controlling food cabinet further includes step of: sensing, by the fourth sensor in real time, whether there is any object existing within a predetermined region around the food cabinet or not, if yes, sending a fourth signal to the processor, and controlling, after the processor receives the fourth signal, the first driving component to stop and controlling the first fixed block to retract to its start position.

In one embodiment, the method of controlling food cabinet further includes step of: after the first fixed block is controlled to retract to its start position based on the fourth signal, when the processor determines that no object exists within the predetermined region around the food cabinet, controlling the first driving component to re-perform the first stroke and the second stroke after a predetermined time period. That is, the first instruction in step 1.1 is generated, so as to start the closing action of the sliding door.

It should be noted that, specific controlling principle of the above-mentioned method of single-motor food cabinet may be referred to the description of the working principle of the single-motor food cabinet in the above-mentioned embodiment; the controlling principle has a corresponding relationship with and the working principle, which will not be repeated herein.

Figure 13:
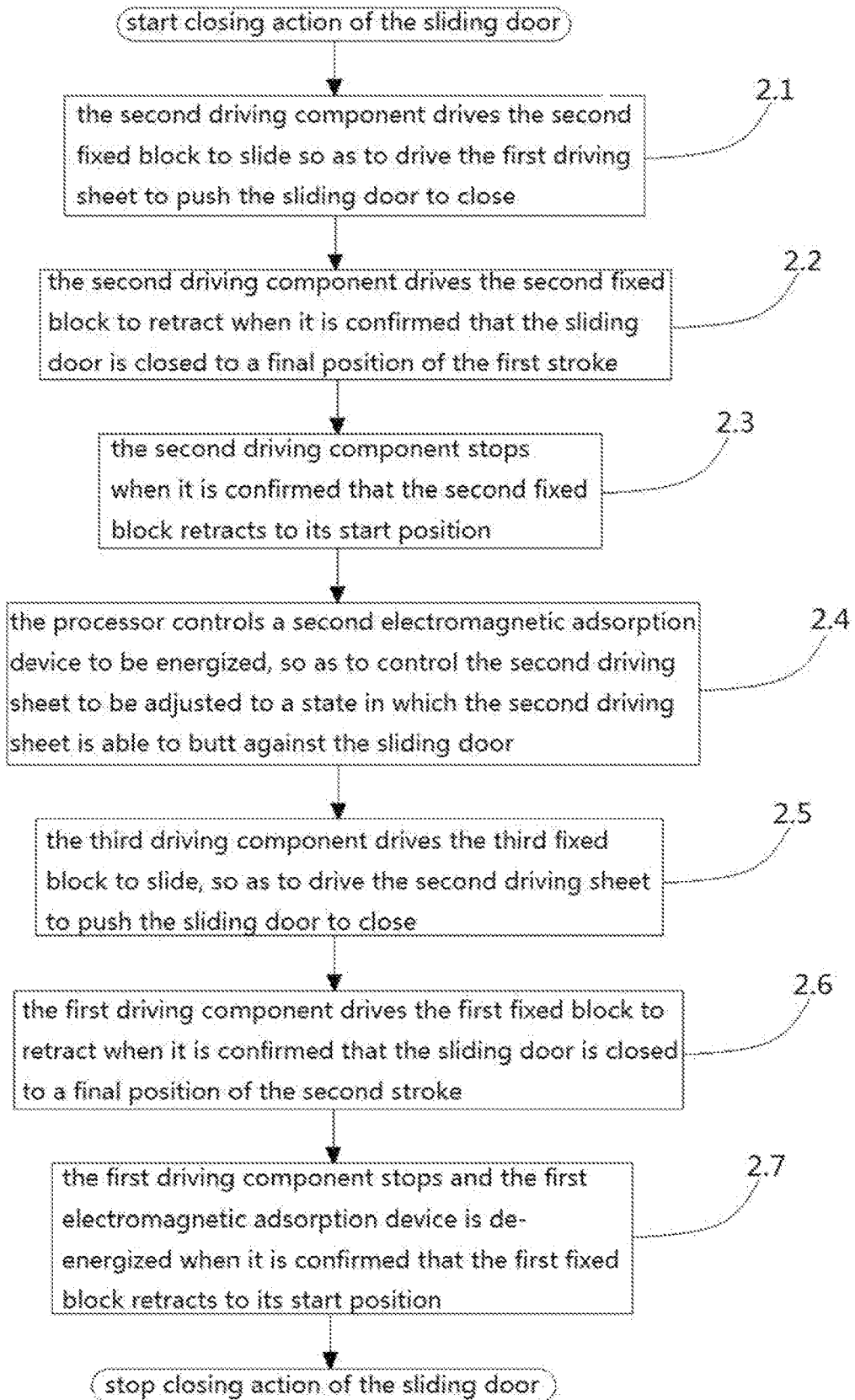
FIG. 13 is a flow chart of a method of controlling food cabinet according to another embodiment.

Please refer to FIG. 13, which provides a flow chart of a method of controlling a dual-motor food cabinet according to one embodiment, the method may be adopted in those food cabinet provided in these above-mentioned embodiments that driven by a dual-motor, the method includes steps of:

Step 2.1: the processor receives a first instruction of controlling the sliding door to close, and controls the second driving component to start closing action of the sliding door base on the first instruction, the second driving component drives the second fixed block to slide so as to drive the first driving sheet to push the sliding door to close. The first instruction may be activated by the user's motion input, or automatically generated by the food cabinet when a preset rule is met.

Step 2.2: when it is confirmed that the sliding door is closed to a final position of the first stroke, the second driving component drives the second fixed block to retract.

Step 2.3: when it is confirmed that the second fixed block retracts to its start position, the second driving component stops.

Step 2.4: the processor controls the second electromagnetic adsorption device to be energized, so as to control the second driving sheet to be adjusted to a state in which the second driving sheet is able to butt against the sliding door.

Step 2.5: the third driving component drives the third fixed block to slide, so as to drive the second driving sheet to push the sliding door to close.

Step 2.6: when it is confirmed that the sliding door is closed to a final position of the second stroke, the first driving component drives the first fixed block to retract.

Step 2.7: when it is confirmed that the first fixed block retracts to its start position, the first driving component stops, and the first electromagnetic adsorption device is de-energized, the sliding door is entirely closed.

In one embodiment, the method of controlling food cabinet further includes step of: sensing, by the eight sensor in real time, whether there is any object existing within a predetermined region around the food cabinet or not, if yes, sending an eighth signal to the processor, and controlling, after the processor receives the eighth signal, the second driving component and the third driving component to stop and controlling the second fixed block and the third fixed block to retract to their start position respectively.

In one embodiment, the method of controlling food cabinet further includes step of: after controlling the second fixed block and the third fixed block to retract to their start position respectively based on the eighth signal, when the processor determines that no object exists within the predetermined region around the food cabinet, controlling the second driving component and the third driving component to re-perform the first stroke and the second stroke after a predetermined time period. That is, the first instruction in step 2.1 is generated, so as to start the closing action of the sliding door.

It should be noted that, specific controlling principle of the above-mentioned method of dual-motor food cabinet may be referred to the description of the working principle of the dual-motor food cabinet in the above-mentioned embodiment; the controlling principle has a corresponding relationship with and the working principle, which will not be repeated herein.

According to the method of control food cabinet of the present disclosure, since two strokes (the first stroke and the second stroke) are set in order to push the sliding door to close, the redundant width of the driving device itself will no longer be offset through reducing the width of the sliding door or increasing the width of the cabinet body. Therefore, the redundant width of the driving device will no longer be considered when designing the width of the sliding door and the width of the cabinet body, which may realize a smaller volume of the cabinet body, and a smaller occupying area. In the meantime, automatically closing of the sliding door of the food cabinet may be realized.

It should be noted that, for one with ordinary skill in the art, one or more technical features mentioned in the above-mentioned embodiments could be combined depend on actual needs, so as to produce new embodiments; these new embodiments may have technical effects that correspond to the one or more technical features.

The above content is only a further detailed description of the present disclosure in combination with specific embodiments; it should not be construed that specific implements of the present disclosure will be limited to those descriptions. For those skilled in the art, simple deducing or replacements may be done, without departure from the idea of the present disclosure.

The invention claimed is:

1. A method of controlling a food cabinet, characterized in that, the food cabinet comprises a cabinet body, a processor and a driving device; a storage platform is disposed on the cabinet body; at least one storage location and at least one slidable sliding door are disposed on the storage platform; the sliding door corresponds to one or more storage locations, and is configured to cover a material stored in the storage location and to be opened when the material is being taken out; the processor is electrically connected to the driving device and configured to control the driving device to drive the sliding door to close; a closing stroke of the sliding door comprises a first stroke and a second stroke, the first stroke defines a fore stroke, and the second stroke defines a hind stroke; the driving device comprises at least one driving component, at least one fixed block, a first driving sheet and a second driving sheet, the first driving sheet and the second driving sheet are fixed on the fixed block; the method, executed by the processor, comprises steps of:

receiving, by the processor, a first instruction of controlling the sliding door to close, and controlling the driving device to start closing action of the sliding door based on the first instruction;

controlling, by the processor, the driving component to drive the fixed block so as to drive the first driving sheet to push the sliding door to close, thereby finishing the first stroke, wherein the first driving sheet butts against the sliding door during the first stroke;

controlling, after confirming by the processor that the first stroke is finished, the second driving sheet to adjust to a state in which the second driving sheet is able to butt against the sliding door; and controlling, by the processor, the driving component to drive the fixed block so as to drive the second driving sheet to push the sliding door to close, thereby finishing the second stroke, whereby the sliding door is entirely closed; wherein the second driving sheet butts against the sliding door during the second stroke.

2. The method of controlling the food cabinet of claim 1, characterized in that, the driving device further comprises a first sliding bar, the driving component comprises a first driving component, the fixed block comprises a first fixed block; the first fixed block is disposed on the first sliding bar; the processor is electrically connected to the first driving component;
- the step of controlling, by the processor, the driving component to drive the fixed block so as to drive the first driving sheet to push the sliding door to close, thereby finishing the first stroke, comprises:
  - controlling, by the processor, the first driving component to drive the first fixed block to slide on the first sliding bar so as to drive the first driving sheet to push the sliding door to close, thereby finishing the first stroke;
- the step of controlling, after confirming by the processor that the first stroke is finished, the second driving sheet to adjust to a state in which the second driving sheet is able to butt against the sliding door comprises:
  - controlling, after confirming by the processor that the first stroke is finished, the first driving component to drive the first fixed block to retract a predetermined stroke, and then controlling the second driving sheet to adjust to the state in which the second driving sheet is able to butt against the sliding door; and
- the step of controlling, by the processor, the driving component to drive the fixed block so as to drive the second driving sheet to push the sliding door to close, thereby finishing the second stroke, whereby the sliding door is entirely closed, comprises:
  - controlling, by the processor, the first driving component to drive the first fixed block so as to drive the second driving sheet to push the sliding door to close, thereby finishing the second stroke, whereby the sliding door is entirely closed.

3. The method of controlling the food cabinet of claim 2, characterized in that, the driving device further comprises a first sensor, the first sensor is electrically connected to the processor;
- the step of confirming by the processor that the first stroke is finished comprises steps of:
  - sending a first signal to the processor when the first sensor senses that the sliding door is moved to a final position of the first stroke; and
  - confirming the first stroke is finished when the processor receives the first signal.

4. The method of controlling the food cabinet of claim 3, characterized in that, the driving device further comprises a second sensor, the second sensor is electrically connected to the processor;
- the step of controlling, after confirming by the processor that the first stroke is finished, the first driving component to drive the first fixed block to retract the predetermined stroke, and then controlling the second driving sheet to adjust to the state in which the second driving sheet is able to butt against the sliding door comprises:
  - controlling, after confirming the first stroke is finished, the first driving component to drive the first fixed block to retract to its start position;
  - sending a second signal to the processor when the second sensor senses that the first fixed block retracts to its start position; and
  - controlling the second driving sheet to adjust to the state in which the second driving sheet is able to butt against the sliding door by the processor when the processor receives the second signal.

5. The method of controlling the food cabinet of claim 4, characterized in that, the driving device further comprises a third sensor, the third sensor is electrically connected to the processor;
- the step of controlling, by the processor, the first driving component to drive the first fixed block so as to drive the second driving sheet to push the sliding door to close, thereby finishing the second stroke, whereby the sliding door is entirely closed, comprises:
  - sending a third signal to the processor when the third sensor senses that the sliding door is moved to a final position of the second stroke; and
  - controlling the first driving component to stop and driving the first fixed block to retract to the start position when the processor receives the third signal.

6. The method of controlling the food cabinet of claim 2, characterized in that, the driving device further comprises a fourth sensor, the fourth sensor is electrically connected to the processor, the method further comprises steps of:
- sending a fourth signal to the processor when the fourth sensor senses an object existing within a predetermined region around the food cabinet; and
- controlling the first driving component to stop and controlling the first fixed block to retract to its start position when the processor receives the fourth signal.

7. The method of controlling the food cabinet of claim 6, characterized in that, the method further comprises step of: after controlling the first fixed block to retract to its start position based on the fourth signal, when the fourth sensor senses no object existing within the predetermined region around the food cabinet, controlling the first driving component to re-perform the first stroke and the second stroke after a predetermined time period.

8. The method of controlling the food cabinet of claim 2, characterized in that, a first electromagnetic attracting device is disposed on the first fixed block;
- the step of controlling the second driving sheet to adjust to a state in which the second driving sheet is able to butt against the sliding door by the processor comprises:
  - controlling, by the processor, the first electromagnetic attracting device to be energized, whereby the first electromagnetic attracting device attracts one end of the second driving sheet to make the other end of the second driving sheet rise, thereby placing the second driving sheet in the state in which the second driving sheet is able to butt against the sliding door.

9. The method of controlling the food cabinet of claim 1, characterized in that, the driving device further comprises a second sliding bar and a third sliding bar, the driving component comprises a second driving component and a third driving component, the fixed block comprises a second fixed block and a third fixed block, the second fixed block is disposed on the second sliding bar, the first driving sheet is disposed on the second fixed block; the third fixed block is disposed on the third sliding bar, the second driving sheet is disposed on the third fixed block; the processor is electrically connected to the second driving component and the third driving component;
- the step of controlling, by the processor, the driving component to drive the fixed block so as to drive the first driving sheet to push the sliding door to close, thereby finishing the first stroke, comprises:
  - controlling, by the processor, the second driving component to drive the second fixed block to slide on the second sliding bar so as to drive the first driving sheet to push the sliding door to close, thereby finishing the first stroke;

the step of controlling, by the processor, the driving component to drive the fixed block so as to drive the second driving sheet to push the sliding door to close, thereby finishing the second stroke, whereby the sliding door is entirely closed, comprises:

controlling, by the processor, the third driving component to drive the third fixed block to slide on the third sliding bar so as to drive the second driving sheet to push the sliding door to close, thereby finishing the second stroke, whereby the sliding door is entirely closed.

10. The method of controlling the food cabinet of claim 9, characterized in that, the driving device further comprises a fifth sensor; the fifth sensor is electrically connected to the processor;

the step of controlling, after confirming by the processor that the first stroke is finished, the second driving sheet to adjust to the state in which the second driving sheet is able to butt against the sliding door comprises:

sending a fifth signal to the processor when the fifth sensor senses that the sliding door is moved to a final position of the first stroke; and controlling the second driving component to stop, driving the second fixed block to retract a predetermined stroke and controlling the second driving sheet to adjust to the state in which the second driving sheet is able to butt against the sliding door after the processor receives the fifth signal.

11. The method of controlling the food cabinet of claim 10, characterized in that, the driving device further comprises a sixth sensor; the sixth sensor is electrically connected to the processor;

the step of controlling the second driving component to stop, driving the second fixed block to retract a predetermined stroke and controlling the second driving sheet to adjust to the state in which the second driving sheet is able to butt against the sliding door after the processor receives the fifth signal comprises:

controlling the first driving component to drive the first fixed block to retract to its start position after the processor receives the fifth signal;

sending a sixth signal to the processor when the sixth sensor senses that the second fixed block retracts to its start position; and controlling the second driving sheet to adjust to the state in which the second driving sheet is able to butt against the sliding door after the processor receives the sixth signal.

12. The method of controlling the food cabinet of claim 11, characterized in that, the driving device further comprises a seventh sensor, the seventh sensor is electrically connected to the processor; the method further comprises steps of:

sending a seventh signal to the processor when the seventh sensor senses that the sliding door is moved to a final position of the second stroke; and controlling the third driving component to stop and driving the third fixed block to retract to its start position when the processor receives the seventh signal.

13. The method of controlling the food cabinet of claim 12, characterized in that, the driving device further comprises a ninth sensor, the ninth sensor is electrically connected to the processor; the method further comprises steps of:

sending a ninth signal to the processor when the ninth sensor senses that the third fixed block retracts to its start position; and controlling the third driving component to stop when the processor receives the ninth signal.

14. The method of controlling the food cabinet of claim 9, characterized in that, the driving device further comprises an eighth sensor, the eighth sensor is electrically connected to the processor; the method further comprises steps of:

sending an eighth signal to the processor when the eighth sensor senses an object existing within the predetermined region around the food cabinet; and controlling the second driving component and the third driving component to stop and driving the second fixed block and the third fixed block to retract to its start position respectively when the processor receives the eighth signal.

15. The method of controlling the food cabinet of claim 14, characterized in that, the method further comprises step of: after controlling the second fixed block and the third fixed block to retract to its start position respectively based on the eighth signal, when the processor determines that no object exists within the predetermined region around the food cabinet, controlling the second driving component and the third driving component to re-perform the first stroke and the second stroke after a predetermined time period.

16. The method of controlling the food cabinet of claim 9, characterized in that, a second electromagnetic attracting device is disposed on the third fixed block;

the step of controlling the second driving sheet to adjust to the state in which the second driving sheet is able to butt against the sliding door by the processor comprises:

controlling the second electromagnetic attracting device to be energized, whereby the second electromagnetic attracting device attracts one end of the second driving sheet to make the other end of the second driving sheet rise, thereby placing the second driving sheet on the state in which the second driving sheet is able to butt against the sliding door.

* * * * *